United States Patent Office 3,377,306
Patented Apr. 9, 1968

3,377,306
STORABLE SILICONE COMPOSITION
James Franklin Hyde, Midland, Mich., assignor to Dow Corning Corporation, Midland, Mich., a corporation of Michigan
No Drawing. Continuation-in-part of application Ser. No. 260,309, Feb. 2, 1963. This application Apr. 9, 1965, Ser. No. 447,074
20 Claims. (Cl. 260—29.2)

ABSTRACT OF THE DISCLOSURE

Method of preventing structure build up between a diorganopolysiloxane having a viscosity of at least 1,000,000 cs. at 25° C. and a reinforcing silica filler by adding water during or prior to the mixing operation.

This invention relates to a method for preventing the undesirable structure formation when certain fillers are mixed with organosilicon polymers.

This application is a continuation-in-part of U.S. application Ser. No. 260,309, filed Feb. 21, 1963, now abandoned.

The use of organosilicon polymers to provide rubbery products is quite broad. The acceptance of these materials was predicated on their ability to provide rubberiness at temperature both higher and lower than that of organic rubbery materials. In addition, the organosilicon rubbery materials possessed other desirable properties such as excellent resistance to weathering, electrical resistance, etc.

Early silicone rubbers suffered from a lack of strength. However, later work provided means to increase the strength to acceptable levels by incorporating with the organosilicon polymer certain finely divided silicas. While these silicas, prepared by any of several processes, provided high strengths to the silicone rubber, they were found to be reactive with the silicone polymer, in that the mixture would rapidly stiffen and harden to an unworkable mass, effectively preventing storage of material not used immediately after mixing. This phenomenon is known by several phrases, among them being structure build-up, structure formation and crepe hardening.

The solution to this particular problem has been approached in a number of ways. One method, described in detail in U.S. Patent 2,890,188, involves addition of a hydroxylated organosilane or siloxane to a mixture of silicone polymer and structure-inducing filler which addition, in proper amount, prevents the structure formation attended to above. Another method, described in U.S. Patent 2,954,357, involves addition of an alkoxy-containing hydrocarbon-substituted polysiloxane to the polymer-filler mixture to prevent the structure formation. Another method, described in U.S. Patent 2,852,484, uses certain dihydric alcohols in the manner described above. Still another method (U.S. Patent 2,983,697) employs triorganosilyl borates to accomplish the same.

Another approach to the problem of polymer-filler interaction has been to alter the filler, presumably on its surface, by various manipulations. One such alteration, being the exposure of silica particles to vapors of cyclic siloxanes, is disclosed in U.S. Patent 3,004,859. A more versatile method, disclosed in U.S. Patent 3,024,126 employs silanols or alkoxysilanes to alter the filler in an organic liquid medium. These processes yield a modified filler that does not induce structure in an organopolysiloxane.

It has now been found unexpectedly that the structure formation between organopolysiloxanes and certain silicas (those that per se produce the structure) can be prevented with a much cheaper, much more readily available reagent.

One object of this invention is to prepare a mixture of organosilicon polymer and highly reinforcing filler that does not build structure on standing.

Another object of this invention is to produce a silicone rubber stock that does not harden when stored for periods of time after mixing.

A further object is to provide a new method for preventing the structure-building interaction between organopolysiloxanes and certain fillers.

These and other objects will be apparent from the following description.

This invention relates to a composition of matter comprising (1) 100 parts by weight of an essentially diorganopolysiloxane having a viscosity of at least 1,000,000 cs. at 25° C. wherein the organic radicals attached thereto are selected from the group consisting of monovalent hydrocarbon radicals, perfluoroalkylethyl radicals, haloaryl radicals and haloalkaryl radicals, (2) from 10 to 100 parts by weight of a reinforcing silica filler having a surface area of at least 50 square meters per grm, and (3) from 7.5 to 40 weight percent of water based on the dry weight of (2) and the weight of water.

Siloxane (1) must have a viscosity of at least 1,000,000 cs. at 25° C. Such high viscosity siloxanes are frequently described as "gums." While essentially all of the units in siloxane (1) are diorganosiloxane units, small amounts of triorganosiloxane, monoorganosiloxane and $SiO_2$ units can be present as is well known in the art. The organic radicals in siloxane (1) can be monovalent hydrocarbon radicals, perfluoroalkylethyl radicals, haloaryl radicals and haloalkaryl radicals.

Examples of the radicals that can be present in diorganopolysiloxane (1) include alkyl radicals such as methyl, ethyl, propyl, tertiary amyl and octadecyl; aliphatically unsaturated radicals such as vinyl, methallyl, butadienyl; and 2-butynyl; cycloaliphatic radicals such as cyclobutyl, cyclopentenyl and cyclohexadienyl; aralkyl radicals such as benzyl and 2-naphthylethyl; aromatic radicals such as phenyl, tolyl, xylyl, xenyl, naphthyl and anthracyl; perfluoroalkylethyl radicals such as $CF_3CH_2CH_2-$, $(CF_3)_2CFCH_2CH_2-$ and $$C_{10}F_{21}CH_2CH_2-$$

haloaryl radicals such as p-chlorophenyl, dibromonaphthyl and penta-fluoroxenyl; and haloalkaryl radicals such as $CF_3C_6H_4-$, $CHI=CHC_6H_4-$ and $$(CF_3)_2C_6H_3C_6H_4-$$

Diorganopolysiloxane (1) can be a polymer, a copolymer, or mixtures of polymers and/or copolymers. Thus, the organic groups in the said diorganopolysiloxane can be the same or different. For some applications of the composition of this invention preferred organic groups are methyl, ethyl, vinyl, allyl, phenyl, xenyl, 3,3,3-trifluoropropyl, chlorophenyl and $CF_3C_6H_4-$, but any of the defined groups are operable.

Silica filler (2) can be any silica filler having a surface area greater than 50 square meters per gram. For the purpose of this invention there is no critical upper limit to the surface area, which may range up to and greater than 900 square meters per gram. Such fillers include silica aerogels, fume silicas and xerogels, and can be present in amounts from 10 to 100 parts, preferably 15 to 80 parts, per hundred parts of siloxane (1).

Also operative in this invention are reinforcing silicas treated as described in U.S. Patent 2,610,167, which of themselves are structure inducing despite their so called treated condition.

The third, and key component of this invention is water. It can be added in fluid form, most easily as the liquid without a diluent. It can also be added as condensing vapor, or as vapor in an atmosphere of high humidity. The amount of water necessary in any given system is dependent on a number of factors, including the type of polysiloxane, the amount and surface area of the silica, and since water is already present to some extent in components (1) and (2), the amount of additional required water will vary on this account. It should be understood that in any case a significant added quantity of water is necessary. The minimum amount of water necessary in any matrix is, however, easily determined, if desired, by the skilled worker. The minimum in any matrix should not be less than 7.5 weight percent based on the dry weight of the silica (2) and the weight of water (3), and preferably not less than 9 weight percent. Because of the recognized volatility of water, even at ordinary temperatures, the mixed composition, if not cured shortly after the addition of water thereto, should be stored in a closed container. Storage exposed to 100 percent humidity will in many cases be sufficient to maintain the mixture in a workable state for an indefinite time. Storage at high humidities will extend the "shelf life" of the mixture if storage in closed containers is inconvenient. If stored in a closed container, the composition remains soft and workable for an indefinitely long period of time.

An advantage of the instant composition is that should the amount of water become too small, as by evaporation, and the mixture harden, it can be easily resoftened and maintained soft and workable by the addition of more water. Thus, the reaction between the silica (2) and polymer (1) is reversible using water.

The maximum amount of water should not exceed 40 weight percent based on the sum of the dry weight of the silica (2) and the weight of water (3), and preferably should not exceed 30 weight percent. When the amount of water is greater than 40 weight percent, the composition is not readily compounded and cured. Excessive water produces bubbling and foaming during compounding and can also cause voids in cured products. Excessive amounts are unnecessary and add to the cost of preparation. The surface area of the silica can be varied and the amount of water both minimum and maximum will vary with the surface area. Larger amounts of water being required for greater surface area.

In addition to the recited ingredients other materials can be present, such as fillers having a surface area less than 50 square meters per gram, such as diatomaceous earth, crushed quartz, sand, or metallic oxides and carbonates such as titania, zinc oxide, calcium carbonate and the like. Such curing catalysts as are commonly used for organosilicon compounds can also be present without departing from the scope of the invention.

These include organic peroxides such as benzoyl peroxide, t-butylperbenzoate and di-t-butylperoxide; and sulfur and organosulfur compounds. In addition, catalysts such as cyanoguanidine, described in U.S. Patent No. 3,086,954, issued April 23, 1963, and urea, described in copending application Ser. No. 254,451, filed Jan. 28, 1963, can also be used.

The composition of this invention is prepared merely by mixing the three components together. The order of addition is unimportant, although conventionally the addition is in the order of the listing of components of the invention. Other conventional methods of mixing are to add the silica and water in alternate small increments, or to add a small amount of the filler and then add the bulk of the required water, thereafter adding the remainder of the filler. The water can be added to the filler by such an expediency as storing the filler in an atmosphere of high humidity, preferably 100 percent relative humidity, and combining the so-conditioned filler with the polysiloxane (1) under like conditions of humidity. With sufficient humidity this process functions without any further added water. Any of the usual equipment used in mixing silicone compositions can be used in any of the conventional processing methods, as necessarily modified by the above.

The compositions of this invention can also contain other additives such as pigments, oxidation inhibitors, compression set additives and the like.

The compositions of this invention can be used wherever silicone rubber finds application, such as ducting, gasketing, wire-covering and the like. Vulcanization can be accomplished by any of the known methods used for silicone rubber, including organic peroxides, sulfur compounds and the various methods that cure at room temperature. In addition, the instant composition can be applied and will set up, by evaporation of the water, to a hard mass, which, while probably not chemically crosslinked can have sufficient rigidity for many uses.

The following examples are illustrative only and should not be construed as limiting the scope of the invention which is properly delineated in the appended claims.

EXAMPLE 1

100 parts of a high polymeric dimethylpolysiloxane gum having a plasticity of 0.060 inch, and 40 parts of a fume silica having a surface area of 225 square meters per gram were mixed together on a two-roll rubber mill, while adding water dropwise until the mixture was smooth and soft. A portion (1) of the mixture was stored in a sealed container for over one year without sign of hardening. Another portion (2) was allowed to "dry out" by exposure to ambient temperature and humidity. The mixture hardened in contrast to the sample (1) stored in a sealed container. Sample (2) was then placed in a closed container along with a quantity of water for a short time. It softened to the consistency of sample (1). This action is in marked contrast to a mixture that is not first "plasticized" with water. This last, once it has hardened, cannot be resoftened merely by exposing to water.

EXAMPLE 2

100 parts of a hydroxyl-endblocked dimethylpolysiloxane gum having a Williams plasticity of 0.070 inch and 40 parts of a fume silica having a surface area of 225 square meters per gram were mixed on a two-roll rubber mill while adding 25 parts of water slowly so that the water was taken up by the milling mass. Two parts of t-butyl-perbenzoate were added. When the final amounts of water were added the mixture became quite soft. The mill rolls were then warmed to slowly drive out the excess water. At a certain point the soft mass suddenly formed to a smooth mass which was moldable and workable. By cooling the mill rolls and adding more water, the sample was easily returned to its soft state, and by heating the rolls to again drive off the excess water the mixture again suddenly firmed up to a consistency that is normal for such a mixture of polymer and filler, illustrating the rapid reversibility of this system.

A portion of the mixture which had the excess water in it was molded at 150° C. for ten minutes in a press. A foam resulted. A second portion was stored in an open container for several days, during which time the excess water evaporated. The resulting mixture readily softened when milled, and when molded as above gave a solid rubber. A third portion was stored in an open container for four months. Some nerve, or structure buildup had occurred, but the sample was readily softened to a moldable consistency by milling a short time. This mixture was vulcanized to a solid rubber by heating in a press for ten minutes at 150° C.

EXAMPLE 3

When 45 g. of a silica aerogel having a surface area of 150 square meters per gram is mixed with 3.65 g. of water and this is in turn mixed with 100 g. of a 3,3,3 - trifluoropropylmethylsiloxane gum having a Williams plasticity of 0.100 inch, the mixture will not show any indication of structure buildup for several months when stored in a closed container.

EXAMPLE 4

When 60 g. of a silica aerogel having a surface area of 80 square meters per gram is mixed with 26 g. of water and is thereafter mixed with 100 g. of a copolymer composed of 35 mol percent phenylmethylsiloxane units, 64 mol percent ethylmethylsiloxane units and one mol percent of divinylsiloxane units and having a viscosity of 3,000,000 cs. at 25° C., the mixture will not crepe harden for several months in a closed container.

EXAMPLE 5

When 100 g. of a fume silica having a surface area of 300 square meters per gram is mixed with 67 g. of water and thereafter mixed with 100 g. of a copolymer having a viscosity of 2,000,000 cs. at 25° C. composed of 0.4 mol percent of dimethylvinylsiloxane units, 10 mol percent of octadecylmethylsiloxane units, 15 mol percent of cyclohexylethylsiloxane units, 74.5 mol percent of dimethylsiloxane units, 0.08 mol percent of trifluorotolylsiloxane units and 0.02 mol percent $SiO_2$ units, the mixture will not crepe harden for several months when stored in a closed container.

EXAMPLE 6

When 30 g. of a fume silica having a surface area of 200 square meters per gram is mixed with 5 g. of water, and thereafter mixed with 100 g. of a copolymer mixture consisting of 70 weight percent of a copolymer containing 75 mol percent of diethylsiloxane units and 25 mol percent of di(chloromethyl)siloxane units and having a viscosity of 1,000,000 cs. at 25° C. and 30 weight percent of a copolymer composed of 10 mol percent of 2-phenylpropylethylsiloxane units and 90 mol percent of ethylmethylsiloxane units and having a viscosity of 4,000,000 cs. at 25° C., the mixture will not have a structure buildup for several months when stored in a closed container.

EXAMPLE 7

Equivalent results are obtained when any of the following fillers are used in place of the fume silica of Example 1, in the amounts as shown:

(a) 80 parts of a silica aerogel, having a surface area of 70 square meters per gram,
(b) 100 parts of a silica aerogel having a surface area of 95 square meters per gram,
(c) 10 parts of a fume silica having a surface area of 500 square meters per gram, and
(d) 25 parts of a fume silica, the said silica having been treated with vapors of $CH_3SiCl_3$, having a surface area of 250 square meters per gram.

EXAMPLE 8

When a silica filler is stored in an atmosphere of 100 percent relative humidity for a sufficient time to pick up 9 weight percent water and is thereafter milled into a dimethylpolysiloxane having a Williams plasticity of .060 inch, such that there are 100 parts of the polysiloxane and 40 parts of the filler, the milling being performed in an atmosphere of 100 percent relative humidity, there is formed a stable composition, which will not show any indication of structure buildup or crepe hardening, even after storage for several months in a closed container.

That which is claimed is:
1. A composition of matter consisting essentially of
  (1) an essentially diorganopolysiloxane having a viscosity of at least 1,000,000 cs. at 25° C. wherein the organic radicals attached thereto are selected from the group consisting of monovalent hydrocarbon radicals, perfluoroalkylethyl radicals, haloaryl radicals and haloalkaryl radicals,
  (2) a reinforcing silica filler having a surface area of at least 50 square meters per gram, and
  (3) water in an amount of from 7.5 to 40 weight percent based on the dry weight of (2) and the weight of water.
2. A composition of matter consisting essentially of
  (1) 100 parts by weight of an essentially diorganopolysiloxane haxing a viscosity of at least 1,000,000 cs. at 25° C. wherein the organic radicals attached thereto are selected from the group consisting of monovalent hydrocarbon radicals, perfluoroalkylethyl radicals, haloaryl radicals and haloalkaryl radicals,
  (2) from 10 to 100 parts by weight of a reinforcing silica filler having a surface area of at least 50 square meters per gram, and
  (3) from 7.5 to 40 weight percent of water based on the dry weight of (2) and the weight of water.
3. The composition of claim 1 wherein the organic radicals of (1) are methyl.
4. The composition of claim 1 wherein the organic radicals of (1) are methyl and vinyl.
5. The composition of claim 1 wherein the organic radicals of (1) are methyl, phenyl and vinyl.
6. The composition of claim 1 wherein the organic radicals of (1) are methyl, vinyl and 3,3,3-trifluoropropyl.
7. The composition of claim 1 wherein the water is present in an amount from 9 to 30 weight percent based on the dry weight of (2) and the weight of water.
8. The composition of claim 2 wherein the water is present in an amount from 9 to 30 weight percent based on the dry weight of (2) and the weight of water.
9. The composition of claim 3 wherein the water is present in an amount from 9 to 30 weight percent based on the dry weight of (2) and the weight of water.
10. The composition of claim 4 wherein the water is present in an amount from 9 to 30 weight percent based on the dry weight of (2) and the weight of water.
11. The composition of claim 5 wherein the water is present in an amount from 9 to 30 weight percent based on the dry weight of (2) and the weight of water.
12. A method of preventing structure formation comprising mixing
  (1) an essentially diorganopolysiloxane having a viscosity of at least 1,000,000 cs. at 25° C. wherein the organic radicals attached thereto are selected from the group consisting of monovalent hydrocarbon radicals, perfluoroalkylethyl radicals, haloaryl radicals and haloalkaryl radicals,
  (2) a reinforcing silica filler having a surface area of at least 50 square meters per gram, and adding
  (3) water to provide from 7.5 to 40 weight percent of water based on the dry weight of (2) and the weight of water.
13. A method of preventing structure formation in a mixture consisting essentially of
  (1) 100 parts by weight of an essentially diorganopolysiloxane having a viscosity of at least 1,000,000 cs. at 25° C. wherein the organic radicals are selected from the group consisting of monovalent hydrocarbon radicals, perfluoroalkylethyl radicals, haloaryl radicals and haloalkaryl radicals, and
  (2) from 10 to 100 parts by weight of a reinforcing silica filler having a surface area of at least 50 square meters per gram, which method consists essentially of adding
  (3) water in an amount to provide from 7.5 to 40 weight percent water based on the dry weight of (2) and the weight of water.
14. A method of restoring to a soft workable condition a dried mixture consisting essentially of
  (1) 100 parts by weight of an essentially diorganopolysiloxane having a viscosity of at least 1,000,000 cs. at 25° C. wherein the organic radicals are selected from the group consisting of monovalent hydrocarbon radicals, perfluoroalkylethyl radicals, haloaryl radicals and haloalkaryl radicals, and (2) from 10 to 100 parts by weight of a reinforcing silica filler having a surface area of at least 50 square meters per gram, said dried mixture, prior to drying, having been prepared in accordance with claim 13 which method comprising working sufficient (3) water into the mixture to provide an amount from 7.5 to 40 weight percent water based on the dry weight of (2) and the weight of water.

15. In the process of compounding a silicone rubber comprising mixing (1) 100 parts by weight of an essentially diorganopolysiloxane having a viscosity of at least 1,000,000 cs. at 25° C. wherein the organic radicals attached thereto are selected from the group consisting of monovalent hydrocarbon radicals, perfluoroalkylethyl radicals, haloaryl radicals, and haloalkaryl radicals, and (2) from 10 to 100 parts by weight of a reinforcing silica filler having a surface area of at least 50 square meters per gram, (3) sufficient water to provide an amount from 7.5 to 40 weight percent water based on the dry weight of (2) and the weight of water.

16. In a process for preventing structure formation in a mixture comprising (1) 100 parts by weight of an essentially diorganopolysiloxane having a viscosity of at least 1,000,000 cs. at 25° C. wherein the organic radicals are selected from the group consisting of monovalent hydrocarbon radicals, perfluoroalkylethyl radicals, haloaryl radicals and haloalkaryl radicals, and (2) from 10 to 100 parts by weight of a reinforcing silica filler having a surface area of at least 50 square meters per gram, the improvement comprising adding water during the mixture of (1) and (2) to provide from 7.5 to 40 weight percent water based on the dry weight of (2) and the weight of water.

17. A process for preventing structure formation comprising (A) exposing a reinforcing silica filler having a surface area of at least 50 square meters per gram to 100 percent relative humidity air for a period of time to provide a water pickup of from 7.5 to 40 weight percent based on the dry weight of silica and the weight of water, and (B) mixing from 10 to 100 parts by weight of the silica produced in (A) with 100 parts by weight of
(1) 100 parts by weight of an essentially diorganopolysiloxane having a viscosity of at least 1,000,000 cs. at 25° C. wherein the organic radicals are selected from the group consisting of monovalent hydrocarbon radicals, perfluoroalkylethyl radicals, haloaryl radicals and haloalkaryl radicals.

18. The process in accordance with claim 17 in which the water pick-up provides from 9 to 30 weight percent water based on the dry weight of silica and the weight of water.

19. A process for preventing structure formation comprising (A) mixing a reinforcing silica filler having a surface area of at least 50 square meters per gram with enough water to provide from 7.5 to 40 weight percent water based on the dry weight of silica and the weight of water, and then (B) mixing from 10 to 100 parts by weight of the silica formed in (A) with 100 parts by weight of
(1) 100 parts by weight of an essentially diorganopolysiloxane having a viscosity of at least 1,000,000 cs. at 25° C. wherein the organic radicals are selected from the group consisting of monovalent hydrocarbon radicals, perfluoroalkylethyl radicals, haloaryl radicals and haloalkaryl radicals.

20. The process in accordance with claim 19 in which the water provides from 9 to 30 weight percent water based on the dry weight of the silica and the weight of water.

References Cited

UNITED STATES PATENTS

| 2,523,281 | 9/1950 | Currie | 260—29.2 |
| 2,838,472 | 6/1958 | Lucas | 260—29.2 |
| 2,881,146 | 4/1959 | Remer et al. | 260—29.2 |

MURRAY TILLMAN, *Primary Examiner.*

J. C. BLEUTGE, *Assistant Examiner.*